United States Patent
Schumann et al.

(10) Patent No.: US 10,487,926 B2
(45) Date of Patent: Nov. 26, 2019

(54) ACTUATOR WITH PLANETARY SCREW DRIVE (PSD)

(71) Applicant: Schaeffler Technologies AG & Co. KG, Herzogenaurach (DE)

(72) Inventors: Lars Schumann, Buehl (DE); Laszlo Man, Ottersweier-Unzhurst (DE); Peter Greb, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 423 days.

(21) Appl. No.: 15/116,745

(22) PCT Filed: Jan. 29, 2015

(86) PCT No.: PCT/DE2015/200045
§ 371 (c)(1),
(2) Date: Aug. 4, 2016

(87) PCT Pub. No.: WO2015/117612
PCT Pub. Date: Aug. 13, 2015

(65) Prior Publication Data
US 2016/0348775 A1    Dec. 1, 2016

(30) Foreign Application Priority Data

Feb. 6, 2014    (DE) .......................... 10 2014 202 118

(51) Int. Cl.
*H02K 7/06* (2006.01)
*F16D 23/12* (2006.01)
(Continued)

(52) U.S. Cl.
CPC ......... *F16H 25/2252* (2013.01); *F16D 23/12* (2013.01); *F16H 25/2266* (2013.01);
(Continued)

(58) Field of Classification Search
CPC .................... F16H 25/2252; F16H 25/2266
See application file for complete search history.

(56) References Cited

U.S. PATENT DOCUMENTS 4,576,057 A    3/1986    Saari
4,926,708 A *  5/1990    Dietrich .............. F16H 25/2252
                                                    74/424.75
(Continued)

FOREIGN PATENT DOCUMENTS

CN    103161906    6/2013
DE       277308 A5  3/1990
(Continued)

*Primary Examiner* — Terence Boes
(74) *Attorney, Agent, or Firm* — Davidson, Davidson & Kappel, LLC

(57) ABSTRACT

An actuator having a planetary screw drive (PSD), in particular for the operation of a clutch of a motor vehicle, wherein a plurality of planetary rollers which mesh with a ring gear that encircles the planetary rollers are in contact with a spindle, where the planetary rollers are positioned at both ends in a planetary roller carrier and the planet carriers are supported non-rotatingly in a sleeve that encircles the ring gear and points radially inward at both ends, wherein the sleeve and the planetary carriers supported in it are axially fixed and connected non-rotatingly to a rotor of a drive and are drivable around an axis of rotation, the spindle is supported non-rotatingly and the spindle performs an axial stroke when the rotor and the planetary carriers supported in the sleeve rotate, is provided.

20 Claims, 8 Drawing Sheets

(51) Int. Cl.
   *F16D 28/00* (2006.01)
   *F16H 25/20* (2006.01)
   *F16H 25/22* (2006.01)
   *H02K 7/116* (2006.01)

(52) U.S. Cl.
   CPC ........ *F16D 28/00* (2013.01); *F16D 2023/123* (2013.01); *F16H 2025/2078* (2013.01); *F16H 2025/2087* (2013.01); *H02K 7/06* (2013.01); *H02K 7/116* (2013.01)

(56) References Cited

U.S. PATENT DOCUMENTS

| | | | |
|---|---|---|---|
| 5,836,208 A * | 11/1998 | Dietrich | F16H 25/2252 74/424.92 |
| 6,343,671 B1 * | 2/2002 | Ackermann | B62D 1/166 180/443 |
| 8,888,644 B2 | 11/2014 | Rink | |
| 9,051,974 B2 | 6/2015 | Gramann et al. | |
| 9,784,256 B2 | 10/2017 | Franz et al. | |
| 2008/0196529 A1 * | 8/2008 | Sugitani | F16H 25/2252 74/424.89 |
| 2012/0217117 A1 | 8/2012 | Gramann et al. | |

FOREIGN PATENT DOCUMENTS

| | | |
|---|---|---|
| DE | 102010047800 A1 | 5/2011 |
| DE | 102010011820 A1 | 9/2011 |
| DE | 102011014932 | 10/2011 |
| DE | 102011088995 A1 | 6/2013 |
| JP | S612964 A | 1/1986 |
| JP | 2004352242 A | 12/2004 |
| JP | 2007064314 | 3/2007 |
| JP | 2008185043 A | 8/2008 |
| JP | 2010270887 A | 12/2010 |
| JP | 2013509540 A | 3/2013 |
| WO | WO2011127888 A2 | 11/2011 |

* cited by examiner

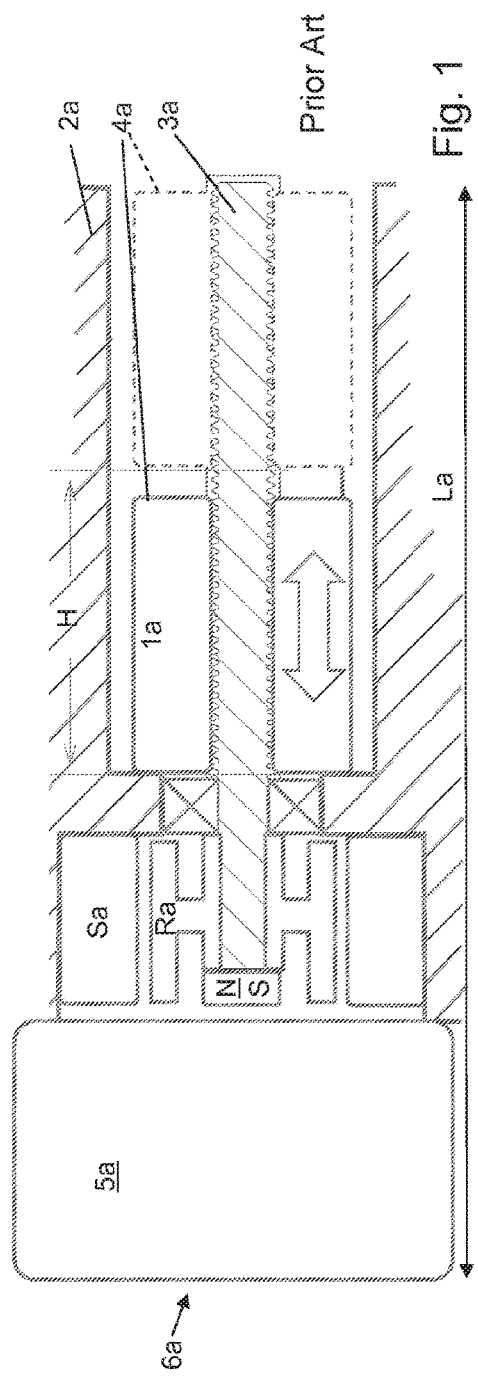
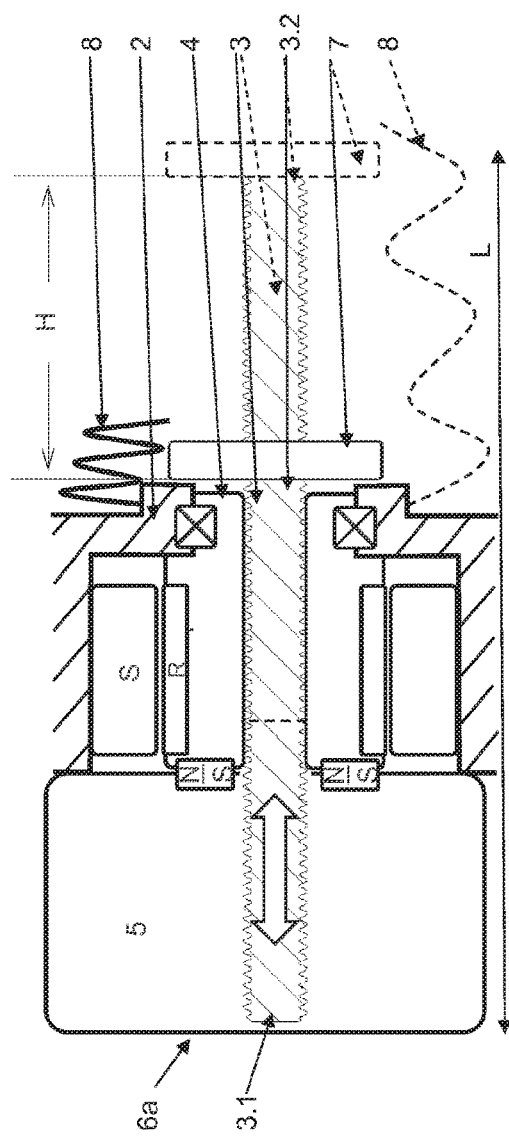

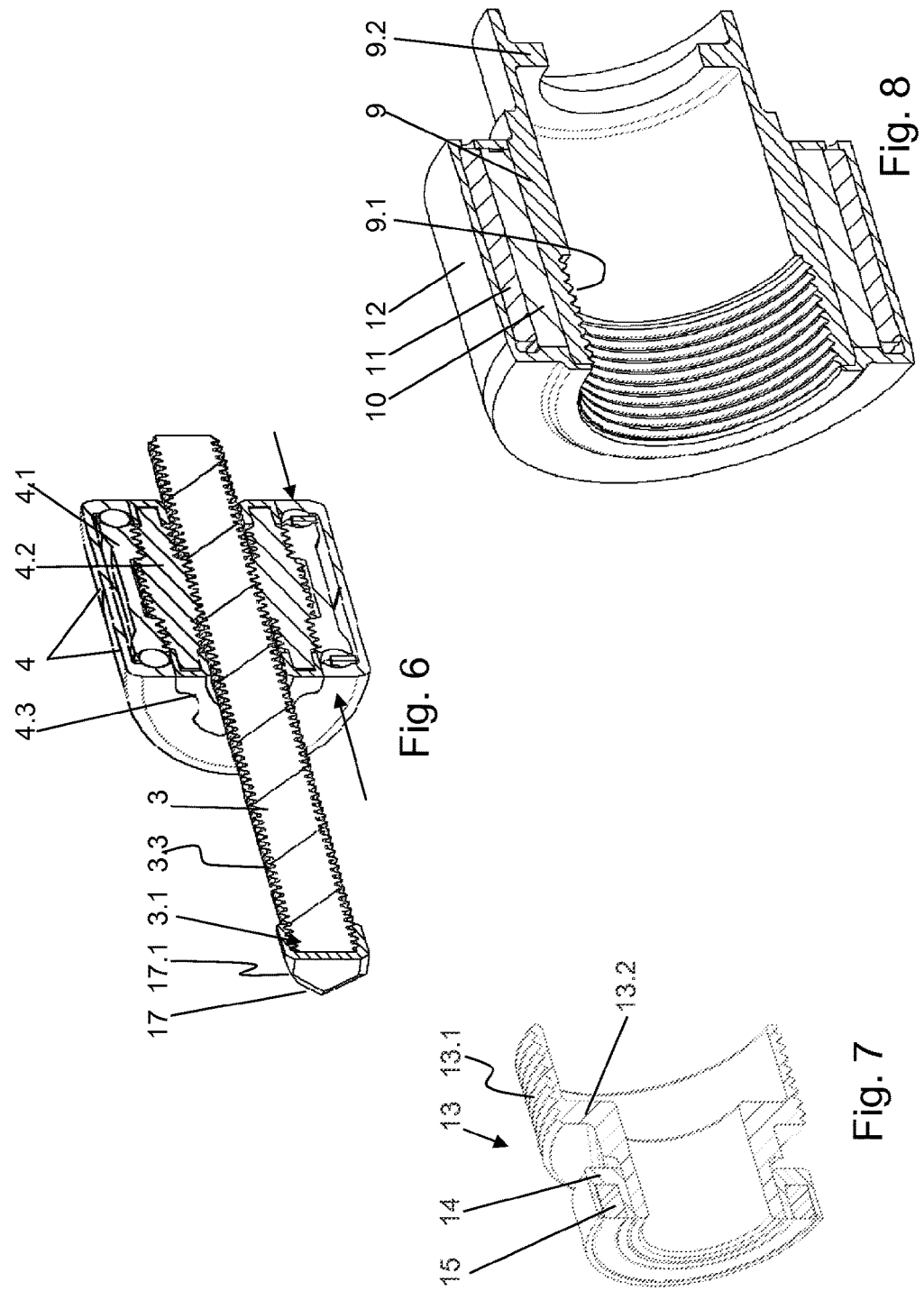

Reference Position

Zero - Position ered a rotary motion produced by means of an electric motor to an axial motion. A planetary screw drive having a screw spindle and having a nut situated on the screw spindle and having a plurality of planet gears distributed around the circumference, positioned between the screw spindle and the nut, which are arranged so that they can roll on the inside circumference of the nut as well as on the outside circumference of the screw spindle, is known from published patent DE 10 2010 011 820 A1. In this solution, a pre-stressing device is provided for the planet gears, wherein the nut has two parts that are movable axially relative to each other, and wherein the pre-stressing device has a spring element that is spring loaded against the one nut part. The nut assumes two functions: on the one hand it is part of the transmission and on the other hand it is part of the pre-stressing device.

ACTUATOR WITH PLANETARY SCREW DRIVE (PSD)

The invention relates to an actuator with a planetary screw drive (PSD).

BACKGROUND

Planetary screw drives (PSDs) (also referred to as planetary roller screw drives) have been the state of the art for many years, and are described, for example, in DD 0277308 A5. A planetary screw drive is known, for example, from published patent DE 10 2010 047 800 A1, which is contained in a hydrostatic actuator in the form of a hydrostatic clutch actuator in order to convert a rotary motion produced by means of an electric motor to an axial motion. A planetary screw drive having a screw spindle and having a nut situated on the screw spindle and having a plurality of planet gears distributed around the circumference, positioned between the screw spindle and the nut, which are arranged so that they can roll on the inside circumference of the nut as well as on the outside circumference of the screw spindle, is known from published patent DE 10 2010 011 820 A1. In this solution, a pre-stressing device is provided for the planet gears, wherein the nut has two parts that are movable axially relative to each other, and wherein the pre-stressing device has a spring element that is spring loaded against the one nut part. The nut assumes two functions: on the one hand it is part of the transmission and on the other hand it is part of the pre-stressing device.

It is also known (see DE 10 2011 088 995 A1) to perform an absolute measurement to register the slip of a PSD having a screw spindle and having a spindle nut situated on the screw spindle and having a plurality of planet gears distributed around the circumference, where a sensor element that is positioned axially immovably relative to the spindle nut registers an axial displacement of the screw spindle and the spindle nut relative to each other, the spindle nut being supported on a housing that has the sensor element so that it can rotate around the spindle axis.

A yet unpublished application describes a disengaging system for a clutch of a motor vehicle, wherein while using a drive a supported piston is actuated so that it is movable axially in a housing by means of a PSD.

The known systems require a large axial construction space, and turn out to be relatively expensive.

Known central clutch releases used in disengaging systems, such as electric clutch releases for example, are built relatively compactly, but are not closed axially and have an essentially ring-shaped structure.

SUMMARY OF THE INVENTION

It is an object of the present invention to develop an actuator with a planetary screw drive which requires little construction space and has a simple design.

The actuator in this case has a planetary screw drive (PSD) and is employed in particular for the operation of a clutch of a motor vehicle, wherein a plurality of planetary rollers which mesh with a ring gear that encircles the planetary rollers are in contact with a spindle, where the planetary rollers are positioned at both ends in a planetary roller carrier and the planetary roller carriers are supported non-rotatingly in a sleeve that encircles the ring gear and points inward at both ends, and according to the invention the sleeve and the planetary carriers supported in it are axially fixed and connected non-rotatingly to a rotor of a drive and are drivable around an axis of rotation, while the spindle is supported non-rotatingly and performs an axial stroke when the rotor and the planetary carriers supported in the sleeve rotate.

This makes it possible for the first time for the rotation of the planetary carrier assigned to the rotor to be converted into an axial motion of the spindle. In contrast to the existing art, this does not require any absolute distance sensor in order to determine the axial position of the spindle, since that can be determined by means of the pitch of the spindle.

Advantageously, through this design the spindle can be recessed in the axial direction at least part way into an electronics housing that accommodates an electronics element of the actuator, for which purpose the electronics element has a cavity into which the spindle can be introduced.

The requisite construction space corresponds approximately to the diameter of the spindle×the stroke, and thus is significantly smaller than in the existing art, which enables the axial construction space of the actuator to be reduced substantially.

To assign the sleeve to the rotor, and thereby to assign the planetary carrier to the rotor, the sleeve is fixed axially between a first flange of a rotor carrier that points radially inward and a second flange of a carrier element that points radially outward, and is encircled radially by the rotor carrier as well as connected non-rotatingly to the rotor carrier. The carrier element on the rotor receives a signal carrier non-rotatingly, and there is a rotation sensor integrated into the motor electronics which registers the rotation.

The connection between the rotor carrier and carrier element preferably takes the form of a threaded connection, for which the rotor carrier has female threading and the carrier element has male threading; this makes it simple to fasten them together. The threaded connection is preferably rotationally secured, for example by a threaded retainer.

The rotor carrier is fixed axially to a bearing, the bearing being supported free of axial play on the housing in such a way that an axial force introduced through the spindle can be diverted into the housing, in particular with the direction reversed.

Only this one bearing is provided; the synchronized PSD itself serves as a second motor bearing.

The spindle is supported non-rotatingly, for example by means of a guide nut.

To fasten the guide nut non-rotatably, it is carried non-rotatingly but axially movably in a hollow profile, the hollow profile in turn being non-rotating in relation to a housing and thus non-rotating in relation to a stator of the drive.

Positioned non-rotatingly at the second end of the spindle is a pressure member, which serves as an interface to an actuating element (for example a piston or a hydraulic chamber of a disengaging system).

To protect the actuator against external influences, in particular in a mechanical interface, a bellows may be used and positioned between the pressure member and/or second end of the spindle and the housing.

A synchronized PSD is preferably used for the actuator according to the invention, so that a certain advancing of the spindle is assigned to a certain rotation.

With the solution according to the invention it is possible to determine the axial stroke of the spindle by means of a rotation of the planetary carriers assigned to the rotor, without using an expensive sensor system for that purpose, because, in contrast to the existing art, an absolute distance sensor is not needed to determine the axial position of the spindle.

The solution according to the invention is advantageously combined with the possibility of referencing, whereby an axial reference position/zero position of an axially movable element of the actuator, in this case the spindle and thus the pressure member, is determinable.

To determine a reference point, a spring assembly that guarantees referencing is provided, which is supported, at least in a reference position and a zero position of the spindle, between the pressure member and an outer ring of the bearing. The pressure member is movable contrary to a disengaging motion against the spring assembly, until the latter is tensioned to the point of blockage. This makes it possible to determine the zero position or an axial reference point of the PSD, and thus of the spindle and the pressure member, by means of the characteristic curve of the spring assembly.

After the reference point/zero point is known, it becomes possible to determine by means of the pitch of the spindle the axial position of the spindle, and thus of the other axially movable components that are connected to it (second sleeve/piston).

The two planet carriers are supported non-rotatingly in a first sleeve, which encircles the ring gear and points radially inward at both ends, and the sleeve is received directly so that it is connected non-rotatingly to the rotor of the drive and axially fixed.

The housing is attached non-rotatingly to a motor block which accommodates the drive (preferably an electric motor).

The non-rotating and axially operable spindle has a pitch≠0, and is advantageously combined only with an angle transmitter for an angle/position sensor, which is connected non-rotatingly to an element of the rotor assembly.

The sleeve is preferably formed in two parts, and its two halves are joined to each other for example by welding or in some other way.

BRIEF DESCRIPTION OF THE DRAWINGS

The invention will be explained in greater detail below on the basis of an exemplary embodiment with corresponding drawings.

The figures show the following:

FIG. 1 the schematic diagram of an actuator according to the existing art,

FIG. 2 the schematic diagram of an actuator according to the invention,

FIG. 6 the transmission in the form of the planetary screw drive (PSD),

FIG. 7 the support with the signal generator,

FIG. 8 the rotor support with the magnet support,

DETAILED DESCRIPTION

Figure 3:
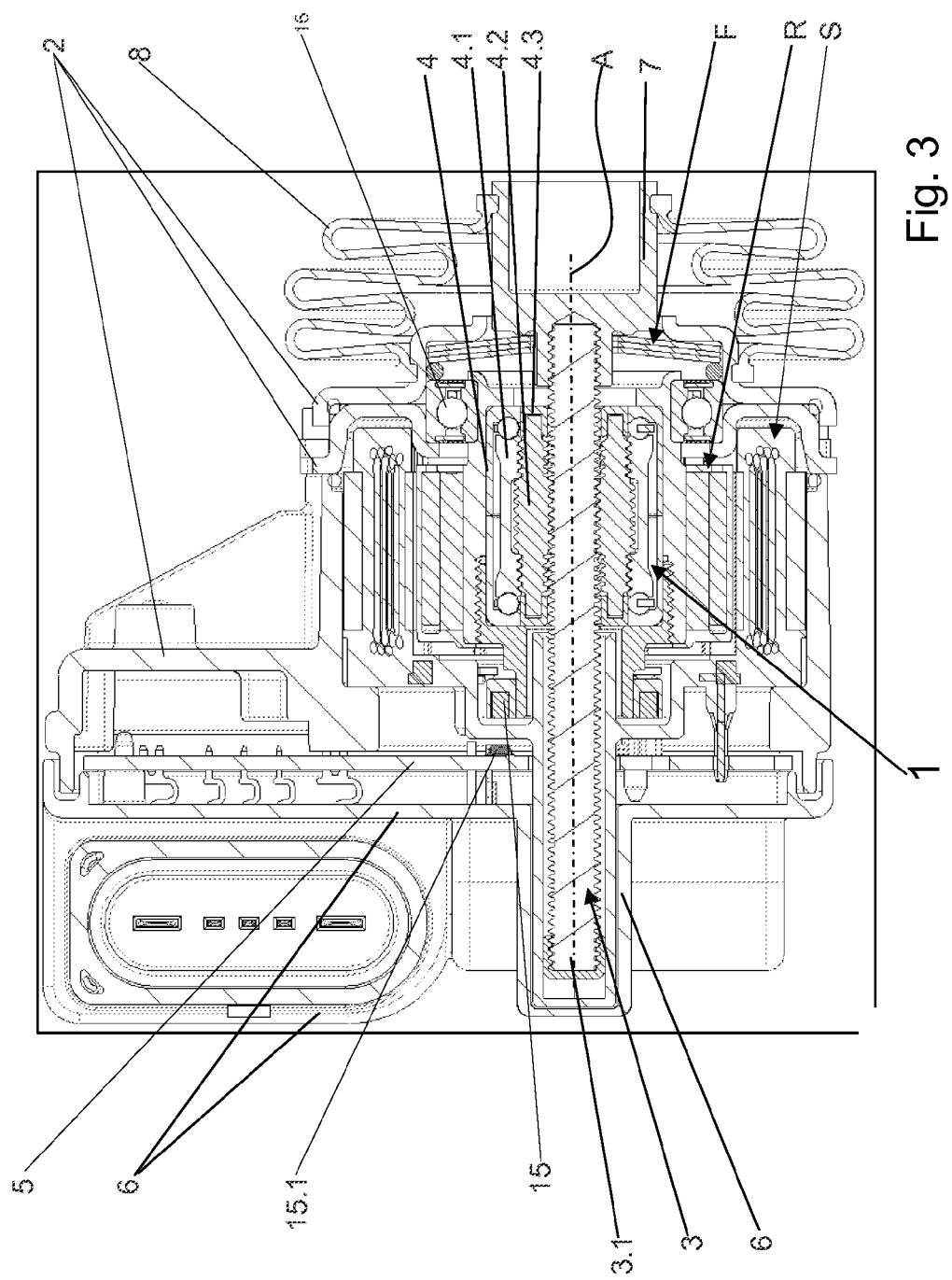
FIG. 3 the longitudinal section of an actuator.

FIG. 1 shows the schematic diagram of an actuator according to the existing art, having a planetary screw drive PSD 1a. The stator Sa sits in a housing 2a, and supported radially within the stator Sa is the rotor Ra, with which the spindle 3a of the PSD 1a rotates and to that end is connected non-rotatingly to the rotor Ra. The spindle 3a is accommodated axially non-rotatingly on the rotor Ra and rotates with the latter, and the planet gears that mesh with the spindle 3a, the ring gear which encircles them, and the planet carrier (not visible here), which is encased by a PSD housing 4a, perform an axial motion in the form of a stroke H when the spindle 3a rotates. The broken line depiction shows the assembly which performs the stroke in its maximally extended position. Located on the side opposite the spindle 3a is an electronics housing 6a which receives the electronics assembly 5a. The actuator has a large construction length La.

FIG. 2 shows the schematic diagram of the actuator according to the invention with planetary screw drive 1. Here too, the stator S of a drive (electric motor) is located in a housing 2. The rotor R is supported radially inside the stator S. In contrast to the existing art, the spindle 3 is non-rotating and axially movable relative to the housing. The planet gears, which mesh with the spindle 3, the ring gear surrounding them and the planet carrier (not visible here), which are encased by a sleeve 4, are coupled directly or through an intermediate element with the rotor R and perform a rotating motion when the rotor R rotates, and the spindle 3, which meshes with the non-shown planet gears, performs an axial stroke motion with a maximum stroke H. In its retracted position, the spindle 3 projects with a first end 3.1 into the electronics assembly 5, and thus into the electronics housing 6 which accommodates the electronics assembly 5. The axial stroke of the spindle 3 can thus be "hidden" in the electronics, so that the construction space needed in the electronics assembly 5 corresponds approximately to the non-labeled outside diameter of the spindle 3×the stroke H. The length of the actuator is reduced by the length by which the spindle 3 in its retracted position plunges into the electronics 5, so that its construction length L is considerably smaller than in the existing art while the stroke H is the same. Fastened at the second end 3.2 of the spindle 3 is a pressure member 7 which acts on the non-shown element that is to be actuated. Between the pressure member 7 and the housing 2 extends an accordion bellows 8, which protects the actuator from becoming soiled and the penetration of moisture. The dashed arrows in FIG. 2 document the components at maximum stroke H of the spindle 2.

FIG. 3 depicts an actuator in longitudinal section, which has a planetary screw drive (PSD) 1 with which the rotary motion of a rotor R produced by an electric motor is converted to an axial stroke motion of the spindle 3 of the PSD 1. The first end 3.1 of the spindle 3 is accommodated to that end on a housing 2 and is thus non-rotating in relation to the stator S of the drive, and in the retracted state of the spindle 3 depicted here projects into the electronics assembly 5 and thus into the electronics housing 6. Positioned non-rotatingly at the second end 3.2 of the spindle 3 is a pressure member 7. An accordion bellows 8 extends between the pressure member 7 and the housing 2. A sleeve 4 encircles the ring gear 4.1, which is engaged with the planetary rollers 4.2, which are supported in planetary roller carriers 4.3 on both sides and mesh with the spindle 3. The sleeve 4 and the planet carriers 4.3 supported in it are axially fixed and connected non-rotatingly to the rotor R of the drive, and are drivable around an axis of rotation A. Since the spindle 3 is supported non-rotatingly, when the rotor R and the planetary roller carriers 4.3 supported in the sleeve 4 rotate it performs an axial stroke H by means of the planetary rollers 4.2. The rotor R and the components which rotate with it are supported on the housing 2 by means of a bearing 16. Positioned on the rotor is a signal generator 15 and on the housing a rotation sensor 15.1, in order to determine the axial position of the spindle 3 by means of the rotation and the pitch of the spindle 3.

To determine a reference point, a spring assembly F is provided.

Figure 5:
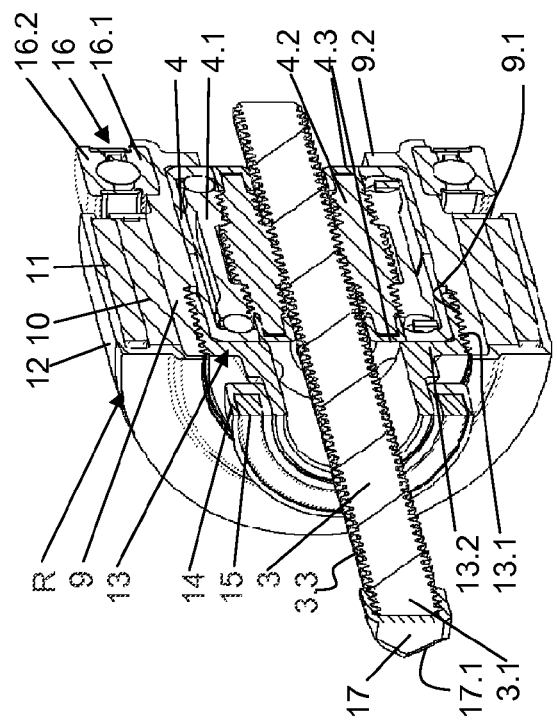
FIG. 5 a longitudinal section of the rotor assembly.
Figure 4:
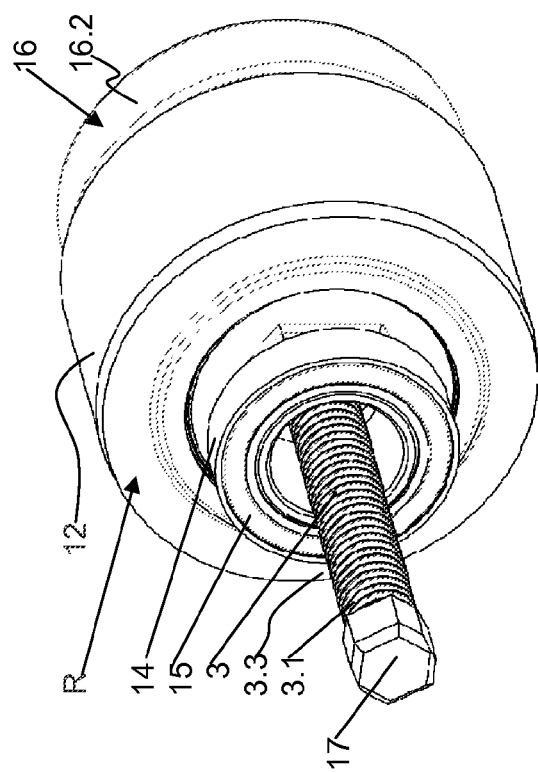
FIG. 4 a three-dimensional depiction of the rotor assembly.

FIGS. 4 and 5 show the rotor assembly and the spindle 3, and FIG. 6 shows the planetary screw drive (PSD) 1 of the rotor assembly. The rotor assembly is made from the rotor R, which is positioned non-rotatingly on a rotor carrier 9, in which the parts of the PSD 1 which rotate with the rotor R are accommodated. The rotor R has a magnet support 10 (iron back) around which magnets 11 are positioned radially outside, and is provided with a sheathing 12. The rotor carrier 9 is provided with female threading 9.1 and with a first collar 9.2 directed radially inward (also see FIG. 8). In addition, a carrier element 13 is provided, which has male threading 13.1 and a second collar 13.2 directed radially inward (also see FIG. 7). The rotor carrier 9 and the carrier element 13 are screwed together by means of the female threading 9.1 and the male threading 13.1, and the sleeve 4 is fixed axially between the first collar 9.2 and the second collar 13.2, because the two halves of the sleeve 4 (which are not designated separately) are tightened against each other axially when the rotor carrier 9 and the carrier element 13 are screwed together. After they are screwed together, the rotor carrier 9, carrier element 13 and sleeve 4 are joined together non-rotatingly. In addition, the threaded connection can be secured against unintended loosening. In the sleeve 4 of the PSD, the planetary roller carriers 4.3 are received non-rotatingly, and the ends of the planetary rollers 4.2 are supported in them. The planetary rollers 4.2 mesh radially outside with the ring gear 4.1 and radially inside with the threading 3.3 of the spindle 3 (also see FIG. 6).

The carrier element 13 accommodates a signal generator 15 non-rotatingly by means of a signal generator carrier 14.

The rotor R or rotor assembly is supported by means of a bearing 16, whose bearing inner ring 16.1 is joined to the rotor carrier 9 so that it is axially fixed and non-rotating, and whose bearing outer ring 16.2 is supported with zero axial tolerance and non-rotatingly on the housing (not depicted here), so that an axial force introduced via the spindle 3 can be diverted into the housing.

During rotation of the rotor assembly described above, the spindle 3 performs an axial stroke motion, and to that end is supported at its first end 3.1 non-rotatingly and axially movably on the housing by means of a guide nut 17, which has an outside profile 17.1. The spindle 3 and the guide nut 17 are joined together non-rotatingly, preferably by means of the male threading 3.3 of the spindle 3 and non-labeled female threading of the guide nut 17.

Figure 9:
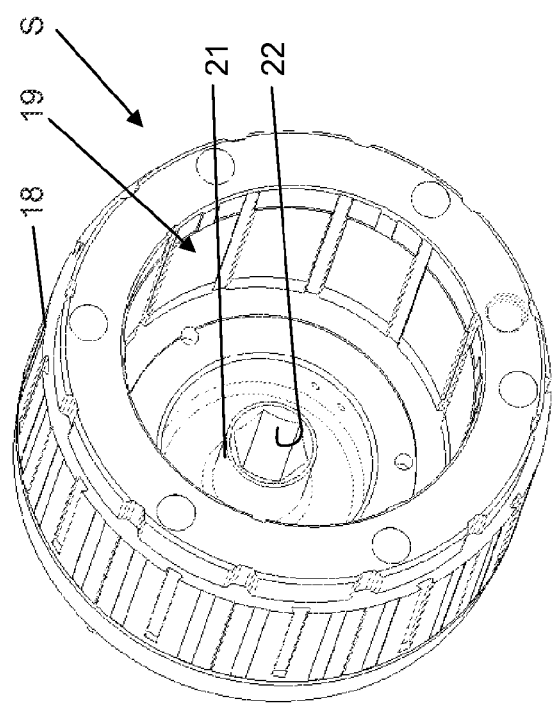
FIG. 9 a three-dimensional depiction of the stator.
Figure 10:
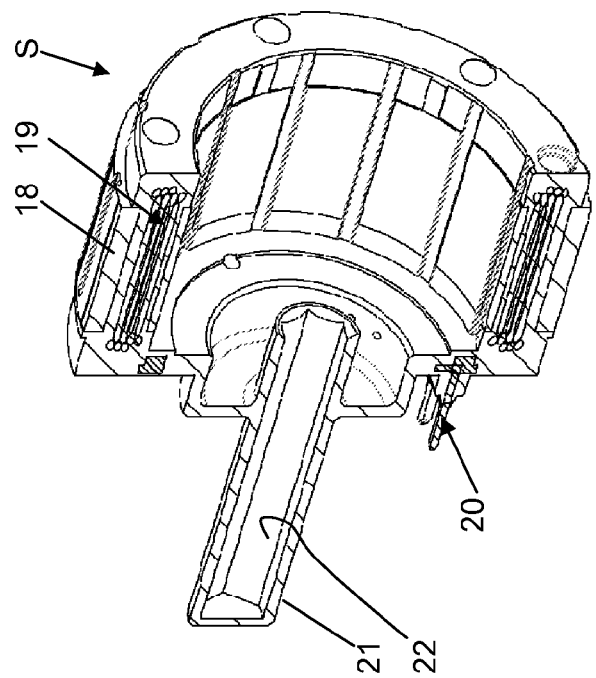
FIG. 10 a longitudinal section of the stator.

The stator S depicted in FIGS. 9 and 10, inside which the rotor R rotates, has radially outside an iron core 18 and radially inside coils 19 with contacts 20 to the electronics assembly, not shown here. A sleeve-type stator carrier 21 is provided with an inside profile 22, in which the outside profile 17.1 of the guide nut 17 is supported non-rotatingly.

Figure 11:
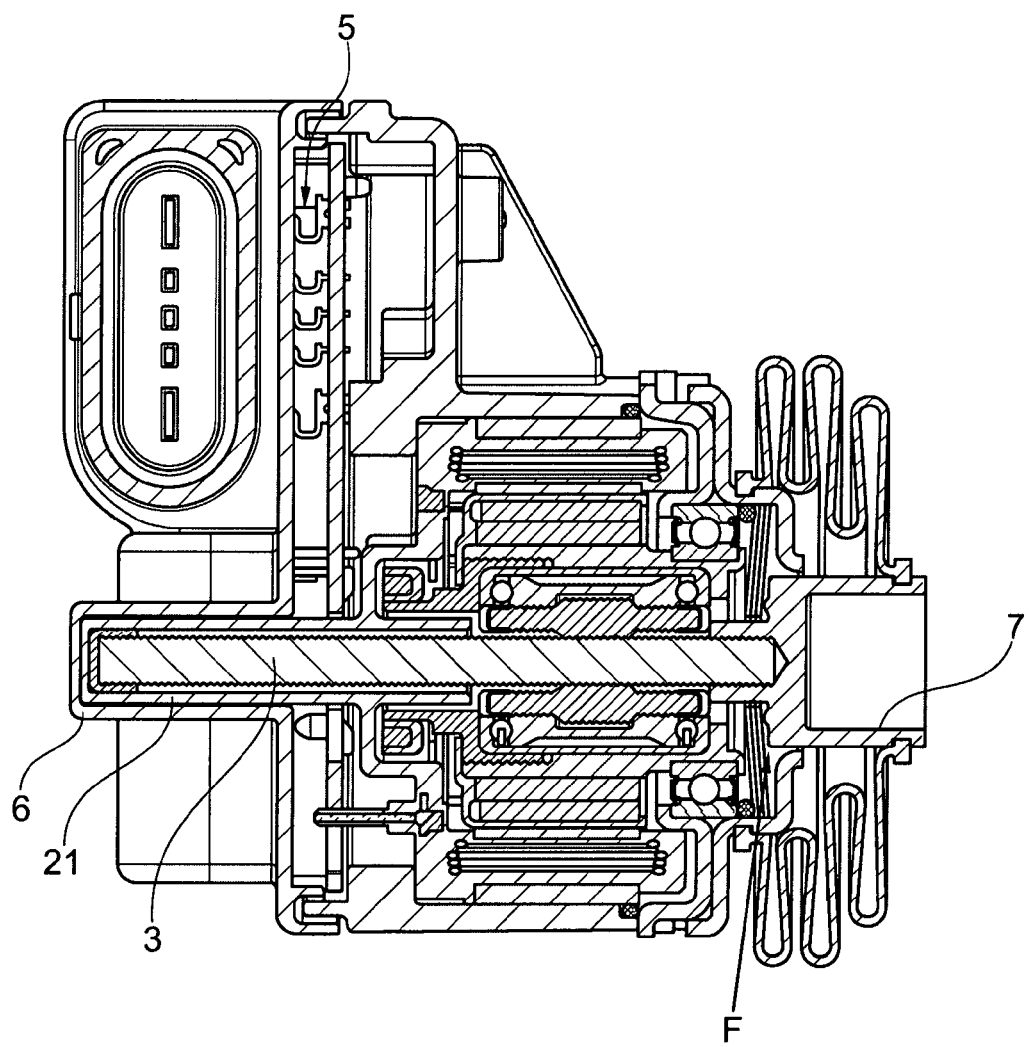
FIG. 11 the longitudinal section of the actuator in the referencing position.
Figure 12:
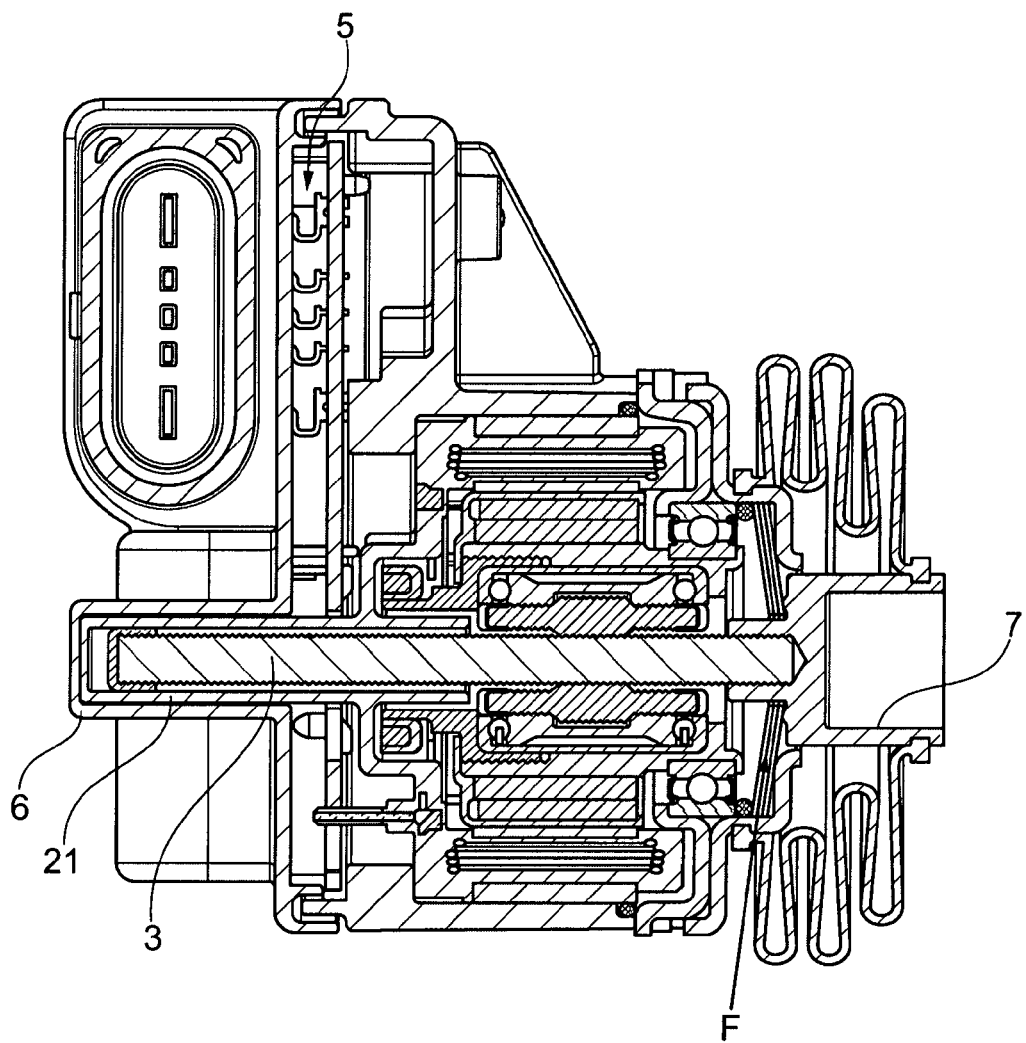
FIG. 12 the longitudinal section of the actuator in the zero position.

FIG. 11 depicts the actuator in the referencing position. In this position, the spindle 3 and the pressure member 7 are in the retracted stop position and the spring assembly 7 is pre-tensioned. To this end, the pressure member 7 is movable contrary to a disengaging motion against the spring assembly F, until the latter is tensioned to the point of blockage. In the zero position according to FIG. 12, the spindle 3 has performed a small stroke, in this case to the right, and the spring assembly released. This makes it possible to determine the zero position or an axial reference point of the PSD, and thus of the spindle and the pressure member, by mean of the characteristic curve of the spring assembly After the reference point/zero point is known, it is possible by means of the slope of the spindle 3 to determine the axial position of the spindle 3 and thus the axial position of the pressure piece 7 which is connected to it, which is realized by means of the signal transmitter 15 on the rotor and the rotation sensor 15.1 on the stator, so that a particular advance of the spindle is assigned to a particular rotation.

Figure 13:
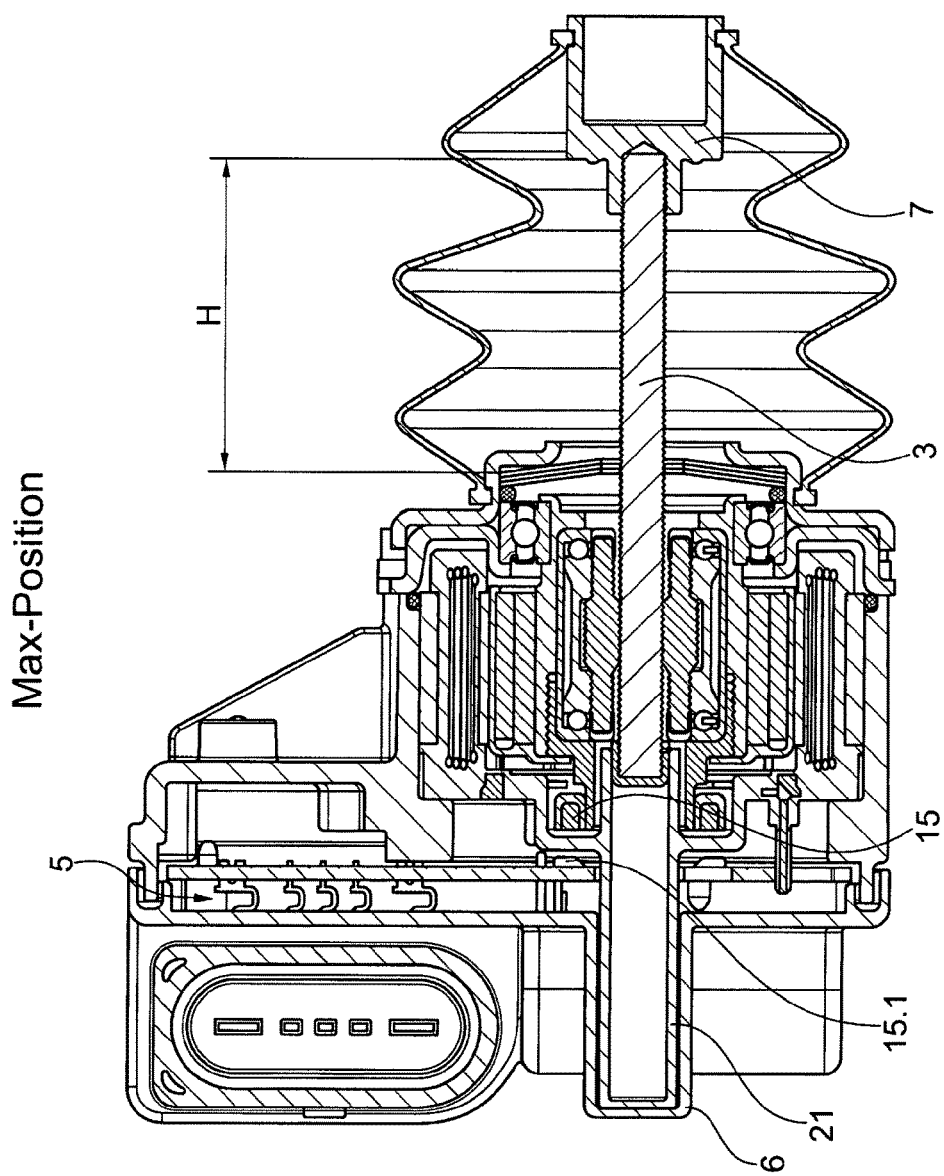
FIG. 13 the longitudinal section of the actuator in the maximally extended position.

The maximally extended position or the maximum stroke H of the spindle 3 and of the pressure member 7 is depicted in FIG. 13.

To ensure a small construction length of the actuator, the stator carrier 21 with the spindle 3 engaged in it projects into the electronics assembly 5, which has a corresponding recess in the electronics housing 6.

REFERENCE LABELS

1*a* planetary screw drive PSD
2*a* housing
3*a* spindle
4*a* PSD housing
5*a* electronics assembly
6*a* electronics housing
H stroke
La construction length
Sa stator
Ra rotor
1 planetary screw drive (PSD)
2 housing
3 spindle
3.1 first end of the spindle
3.2 second end of the spindle
3.3 threading
4 sleeve
4.1 ring gear
4.2 planetary rollers
4.3 planetary roller carrier
5 electronics assembly
6 electronics housing
7 pressure member
8 bellows
9 rotor carrier
9.1 female threading
9.2 first collar
10 magnet carrier
11 magnets
12 sheathing
13 carrier element
13.1 male threading
13.2 second collar
14 signal generator carrier
15 signal generator
15.1 rotation sensor
16 bearing 16.1 bearing inner ring
16.2 bearing outer ring
17 guide nut
17.1 outside profile
18 iron core
19 coils
20 contacts
21 stator carrier
22 inside profile
F spring assembly
H stroke
L construction length
R rotor
S stator
S1 signal transmitter
S2 rotation sensor

What is claimed is:

1. An actuator comprising:
a planetary screw drive, the planetary screw drive including a plurality of planetary rollers, a plurality of planetary roller carriers, a sleeve, a spindle, and a ring gear that encircles the planetary rollers;
wherein the planetary rollers are engaged with the spindle and mesh with the ring gear;
wherein the planetary rollers are positioned at both ends in a respective one of the planetary roller carriers, and the planetary roller carriers are supported non-rotatingly in the sleeve, wherein the sleeve encircles the ring gear and points radially inward at both ends;
wherein the sleeve and the planetary roller carriers supported in the sleeve are axially fixed and connected non-rotatingly to a rotor of a drive, and are drivable around an axis of rotation;
wherein the spindle is supported non-rotatingly in relation to a housing and a stator of the drive,
wherein a first end of the spindle is supported inside a stator carrier fixed to the stator,
wherein the spindle performs an axial stroke when the rotor and the planetary roller carrier supported in the sleeve rotate such that the first end of the spindle moves axially within the stator carrier.

2. An actuator according to claim 1, wherein the spindle is recessed in an axial direction at least part way into an electronics housing that accommodates an electronics assembly of the actuator, and in that the electronics assembly has a cavity into which the spindle can be introduced.

3. An actuator according to claim 1, wherein the sleeve is fixed axially between a radially inward-directed first collar of a rotor carrier and a radially inward-directed second collar of a carrier element, wherein the rotor carrier and the carrier element are joined together non-rotatingly and wherein the carrier element accommodates a signal generator non-rotatingly.

4. An actuator according to claim 3, characterized in that the connection between the rotor carrier and the carrier element is designed in the form of a threaded connection for which the rotor carrier has female threading and the carrier element has male threading, and in that the rotor carrier has an axially fixed connection to a bearing, wherein the bearing is supported with zero axial tolerance on the housing in such a way that an axial force introduced via the spindle can be diverted into the housing.

5. An actuator according to claim 4, wherein the axial force of the spindle can be diverted through the rotor carrier and the bearing into the housing.

6. An actuator according to claim 1, wherein the spindle is supported non-rotatingly by means of a guide nut.

7. An actuator according to claim 6, wherein the guide nut is attached and rotationally secured on the first end of the spindle and is carried axially movably in the stator carrier, and wherein the stator carrier is non-rotating in relation to the housing and thus non-rotating in relation to the stator of the drive, and wherein at a second end of the spindle a pressure member is positioned non-rotatingly which serves as an interface to an element that is to be actuated.

8. An actuator according to claim 7, wherein a bellows is positioned between the pressure member and/or the second end of the spindle and the housing.

9. An actuator according to claim 1, wherein the planetary screw drive comprises a synchronized planetary screw drive, so that a particular advance of the spindle is assigned to a particular rotation.

10. An actuator according to claim 7, wherein a spring assembly which ensures a referencing is supported between the pressure member and a bearing outer ring of a bearing, at least in a reference position and a zero position of the spindle.

11. An actuator according to claim 7 wherein the stator carrier has a hollow profile.

12. An actuator according to claim 8, wherein the bellows is an accordion bellows.

13. An actuator according to claim 1, wherein the actuator is an actuator for operating a clutch of a motor vehicle.

14. An actuator comprising:
a planetary screw drive, the planetary screw drive including a plurality of planetary rollers, a plurality of planetary roller carriers, a sleeve, a spindle, and a ring gear that encircles the planetary rollers;
wherein the planetary rollers are engaged with the spindle and mesh with the ring gear;
wherein the planetary rollers are positioned at both ends in a respective one of the planetary roller carriers, and the planetary roller carriers are supported non-rotatingly in the sleeve, wherein the sleeve encircles the ring gear and points radially inward at both ends;
wherein the sleeve and the planetary roller carriers supported in the sleeve are axially fixed and connected non-rotatingly to a rotor of a drive, and are drivable around an axis of rotation;
wherein the spindle is supported non-rotatingly in relation to a housing and a stator of the drive, and
wherein the spindle performs an axial stroke when the rotor and the planetary roller carrier supported in the sleeve rotate,
wherein the spindle is supported non-rotatingly by means of a guide nut.

15. An actuator comprising:
a planetary screw drive, the planetary screw drive including a plurality of planetary rollers, a plurality of planetary roller carriers, a sleeve, a spindle, and a ring gear that encircles the planetary rollers;
wherein the planetary rollers are engaged with the spindle and mesh with the ring gear;
wherein the planetary rollers are positioned at both ends in a respective one of the planetary roller carriers, and the planetary roller carriers are supported non-rotatingly in the sleeve, wherein the sleeve encircles the ring gear and points radially inward at both ends;
wherein the sleeve and the planetary roller carriers supported in the sleeve are axially fixed and connected non-rotatingly to a rotor of a drive, and are drivable around an axis of rotation;
wherein the spindle is supported non-rotatingly in relation to a housing and a stator of the drive, and wherein the spindle performs an axial stroke when the rotor and the planetary roller carrier supported in the sleeve rotate, wherein the spindle is recessed in an the axial direction at least part way into an electronics housing that accommodates an electronics assembly of the actuator, and in that the electronics assembly has a cavity into which the spindle can be introduced.

16. An actuator according to claim 14, wherein the guide nut is attached and rotationally secured on a first end of the spindle and is carried axially movably in a stator carrier, and wherein the stator carrier is non-rotating in relation to the housing and thus non-rotating in relation to the stator of the drive, and wherein a second end of the spindle a pressure member is positioned non-rotatingly which serves as an interface to an element that is to be actuated.

17. An actuator according to claim 16 wherein the stator carrier has a hollow profile.

18. An actuator according to claim 16, wherein a bellows is positioned between the pressure member and/or the second end of the spindle and the housing.

19. An actuator according to claim 18, wherein the bellows is an accordion bellows.

20. An actuator according to claim 2, wherein the stator carrier is sleeve-shaped and an end of the stator carrier is configured for being introduced into the cavity.

* * * * *